(12) United States Patent
Beadle et al.

(10) Patent No.: US 6,305,012 B1
(45) Date of Patent: Oct. 16, 2001

(54) METHOD AND APPARATUS FOR DYNAMIC SELECTION OF INSTRUCTIONS FOR COMPILING USING TAGS

(75) Inventors: Bruce Anthony Beadle, Round Rock; Michael Wayne Brown, Georgetwon; Michael Anthony Paolini; Douglas Scott Rothert, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,516

(22) Filed: Dec. 3, 1998

(51) Int. Cl.$^7$ .................................................. G06F 9/445
(52) U.S. Cl. ............................................................. 717/5
(58) Field of Search ...................................................... 717/5

(56) References Cited

U.S. PATENT DOCUMENTS 5,815,718 * 9/1998 Tock ..................................... 395/705
5,937,193 * 4/1999 Evoy ..................................... 395/705
6,055,526 * 4/2000 Ambroziak ............................. 707/2
6,092,120 * 7/2000 Swaminathan et al. ............. 709/247
6,139,199 * 10/2000 Rodriguez ........................... 395/709

* cited by examiner

Primary Examiner—Mark R. Powell
Assistant Examiner—Michael B. Holmes
(74) Attorney, Agent, or Firm—Duke W. Yee; Jeffrey S. LaBaw

(57) ABSTRACT

A method and apparatus in a computer for selectively compiling a set of instructions for an application using a compiler. A web page is received. The web page is parsed for a tag, wherein the tag includes an indication of whether the set of instructions are to be compiled. Responsive to a determination that the tag indicates that the set of instructions should be compiled, a set of instructions is sent to the compiler, wherein the compiler generates a set of native instructions for execution by the computer.

20 Claims, 4 Drawing Sheets

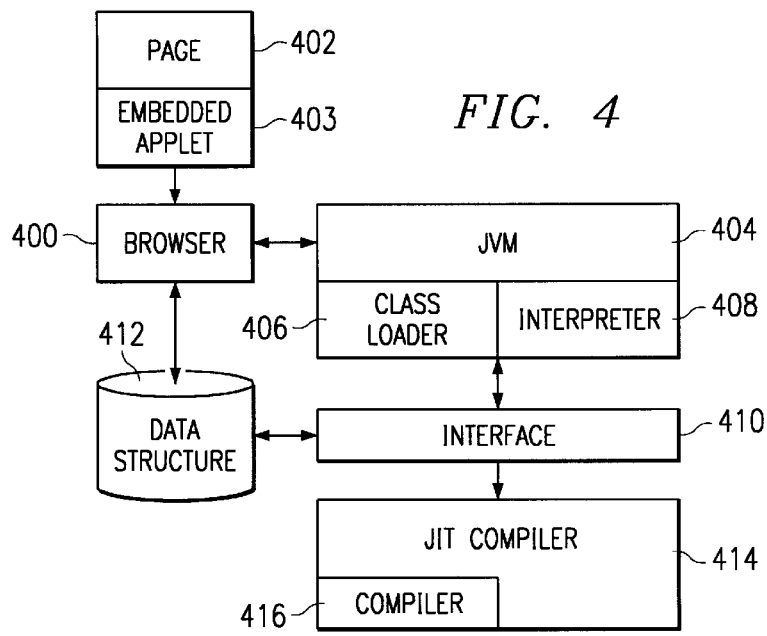

FIG. 4

```
                                                    500       502
<applet code=ticker.class codebase=/ticker neverJITThisClass=ticker></applet>
```
FIG. 5A

```
                                                         504
<applet code=ticker.class codebase=/ticker neverJITThisMethod=ticker.init></applet>
```
FIG. 5B

```
                                                         506
<applet code=ticker.class codebase=/ticker neverJitthese=http://MyCompany/ticker_jit_list.txt>
```
FIG. 5C

FIG. 6

| CLASS/METHOD A | JIT | 602 |
|---|---|---|
| CLASS/METHOD B | NO JIT | 604 |
| CLASS/METHOD C | JIT | 606 |
| CLASS/METHOD D | NO JIT | 608 |
| CLASS/METHOD E | NO JIT | 610 |
| CLASS/METHOD F | JIT | 612 |

600

METHOD AND APPARATUS FOR DYNAMIC SELECTION OF INSTRUCTIONS FOR COMPILING USING TAGS

CROSS REFERENCE TO RELATED APPLICATIONS

The present invention is related to applications entitled A Method And Apparatus To Coordinate And Control The Simultaneous Use Of Multiple Just In Time Compilers With A Java Virtual Machine, Ser. No. 09/204,513; A Method And Apparatus To Selectively Control Processing Of A Method In A Java Virtual Machine, Ser. No. 09/204,512; Method And Apparatus For Automatic Service Of JIT Compiler Generated Errors, Ser. No. 09/204,511; Method And Apparatus For Dynamically Selecting Bytecodes For Just In Time Compiling In A User's Environment, Ser. No. 09/204,976; A Method And Apparatus For Dynamic Selection Of Which Bytecodes Should Be Just In Time Compiled, Ser. No. 09/204,519; JIT/Compiler Java Language Extensions To Enable Field Performance and Serviceability, Ser. No. 09/204,968; and A Method And Apparatus To Selectively Control Processing Of A Method In A Java Virtual Machine, Ser. No. 09/204,975, all of which are filed even date hereof, assigned to the same assignee, and incorporated herein by reference.

BACKGROUND OF THE INVENTION

1. Technical Field

The present invention relates generally to an improved data processing system, and in particular to an improved method and apparatus for processing instructions in a data processing system. Still more particularly, the present invention relates to an improved method and apparatus to selectively compile instructions in a data processing system.

2. Description of Related Art

Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refer to the collection of networks and gateways that use the Transmission Control Protocol/Internet Protocol (TCP/IP) suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Operating costs may be reduced by providing informational guides and/or searchable databases of public records online.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). Information is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for you, but mostly for your Web "browser". A browser is a program capable of submitting a request for information identified by a URL at the client machine. Retrieval of information on the Web is generally accomplished with an HTML-compatible browser. The Internet also is widely used to transfer applications to users using browsers.

Users exploring the Web discovered that the content supported by HTML document format on the Web was too limited. Users desired an ability to access applications and programs, but applications were targeted towards specific types of platforms. As a result, not everyone could access applications or programs. This deficiency has been minimized though the introduction and use of programs known as "applets", which may be embedded as objects in HTML documents on the Web. Applets are Java programs that may be transparently downloaded into a browser supporting Java along with HTML pages in which they appear. These Java programs are network and platform independent. Applets run the same way regardless of where they originate or what kind of data processing system onto which they are loaded.

Java is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods. Java provides a mechanism to distribute software and extends the capabilities of a Web browser because programmers can write an applet once and the applet can be run on any Java enabled machine on the Web. The Java virtual machine (JVM) is a virtual computer component that resides only in memory. The JVM allows Java programs to be executed on a different platform opposed to only the one platform for which the code was compiled. Java programs are compiled for the JVM. In this manner Java is able to support applications for many types of data processing systems, which may contain a variety of central processing units and operating systems architectures. To enable a Java application to execute on different types of data processing systems, a compiler typically generates an architecture-neutral file format of the compiled code that is executable on many processors, given the presence of the Java run time system. The Java compiler generates bytecode instructions that are non-specific to a particular computer architecture. A bytecode is a machine independent code generated by the Java compiler and executed by a Java interpreter. A Java interpreter is a module in the JVM that alternatively decodes and executes a bytecode or bytecodes. These bytecode instructions are designed to be easy to interpret on any machine and easily translated on the fly into native machine code.

Invalid and unpredictable results may sometimes occur from just in time compiling of Java bytecodes. These errors do not occur if the code is not just in time compiled and are typically the results of faulty logic within the just in time compiler. As a result, just in time compiling of applets does not always provide for uniform execution of programs associated with HTML web pages. In addition, the performance of the Java applets of application is not always faster if the application is just in time compiled when the overhead associated with the process of just in time compiling is used for code that is seldom used.

Therefore, it would be advantageous to have an improved method and apparatus for selectively just in time compiling applets in other programs. Traditionally, this problem is addressed by either changing the Java code or recompiling the code to overcome the problems with just in time compiling. In many cases such a fix is not possible or reasonable. Alternatively, the just in time compiler must be serviced and adjusted to avoid the error. Typically, such changes are slow to occur. Alternatively, the just in time compiler can be disabled in the virtual machine, which often times results in performance hits.

SUMMARY OF THE INVENTION

The present invention provides a process in a computer for selectively compiling a set of instructions for an application using a compiler. A web page is received. The web page is parsed for a tag, wherein the tag includes an indication of whether the set of instructions are to be compiled. Responsive to a determination that the tag indicates that the set of instructions should be compiled, a set of instructions is sent to the compiler, wherein the compiler generates a set of native instructions for execution by the computer.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a diagram of components used to selectively process methods in accordance with a preferred embodiment of the present invention;

FIGS. 5A–5C are examples of tags used in HTML pages for indicating whether methods or classes should be just in time compiled;

FIG. 6 is an example of a data structure containing user specified data for class/method information in accordance with a preferred embodiment of the present invention;

DETAILED DESCRIPTION OF THE PREFERRED EMBODIMENT

Figure 1:
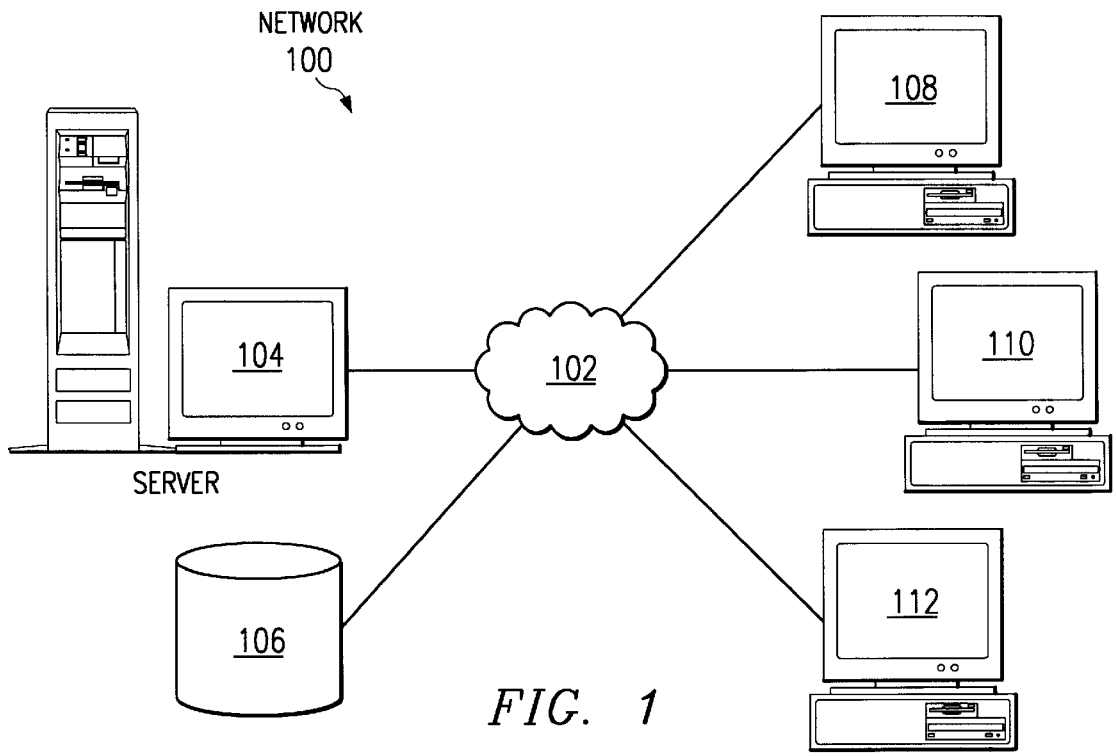
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections. In this example, a server, such as server 104 may be a web server from which clients, such as clients 108–112 may retrieve HTML web pages containing applets.

In the depicted example, server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as for example, an intranet or a local area network.

FIG. 1 is intended as an example, and not as an architectural limitation for the processes of the present invention.

Figure 2:
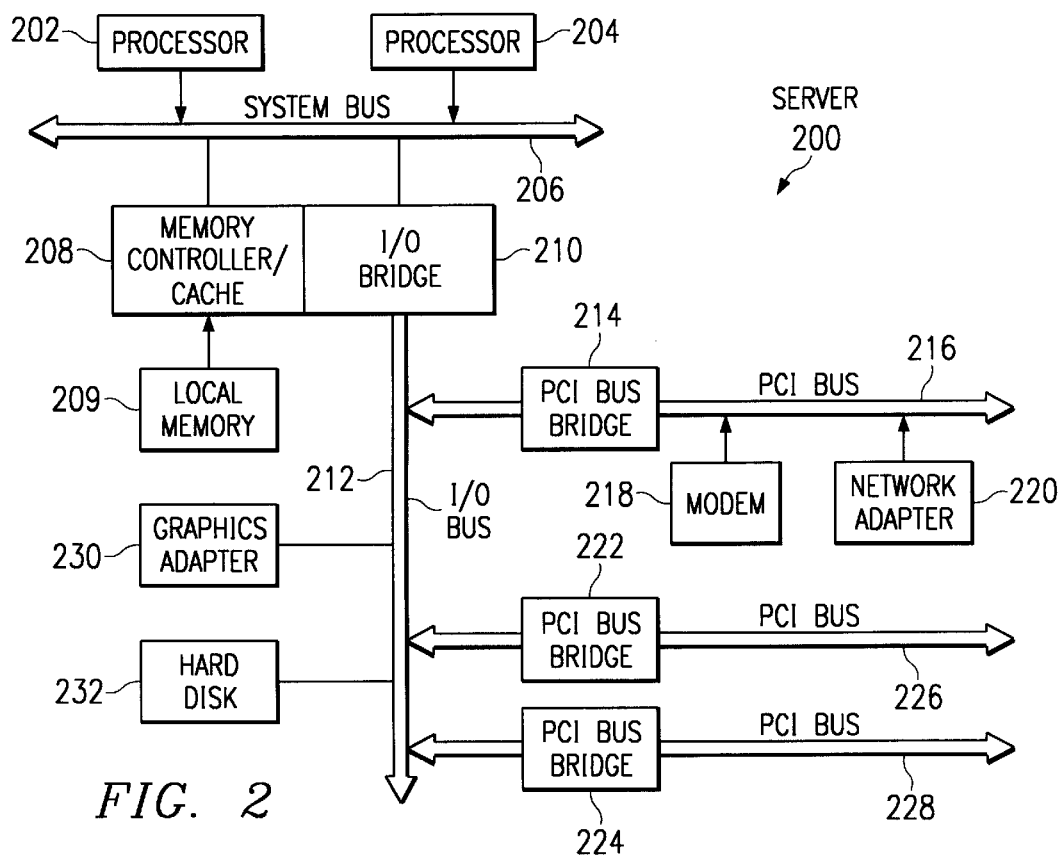
FIG. 2 is a block diagram of a data processing system which may be implemented as a server in accordance the present invention.

Referring to FIG. 2, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
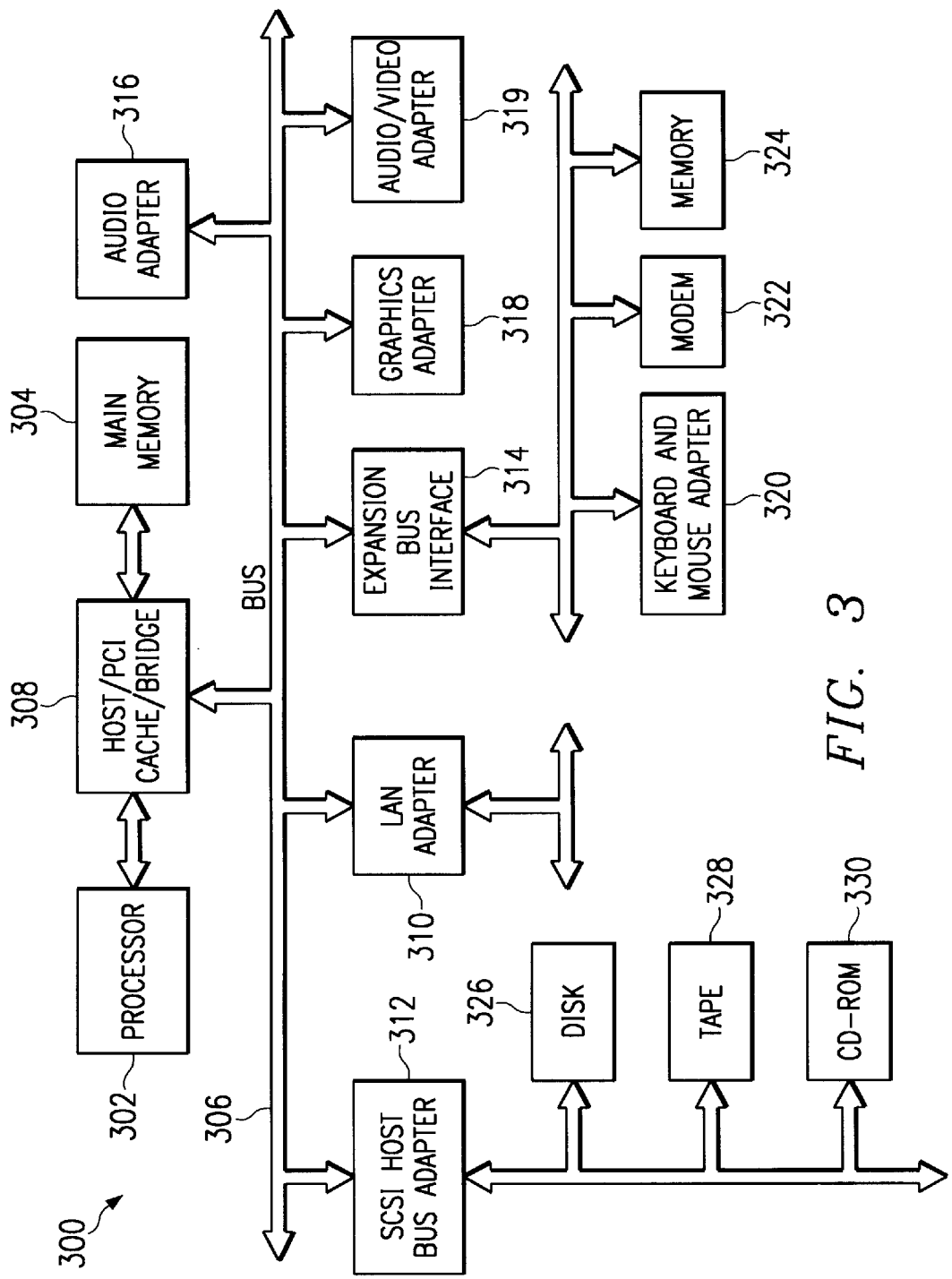
FIG. 3 is a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 314, small computer system interface (SCSI) host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330 in the depicted example. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. Instructions for the operating system, the object-oriented operating system, and applications or programs are located on storage devices, such as hard disk drive 326 and may be loaded into main memory 304 for execution by processor 302.

Those of ordinary skill in the art will appreciate that the hardware in FIG. 3 may vary depending on the implementation. For example, other peripheral devices, such as optical disk drives and the like may be used in addition to or in place of the hardware depicted in FIG. 3. The depicted example is not meant to imply is architectural limitations with respect to the present invention. For example, the processes of the present invention may be applied to multiprocessor data processing system.

The present invention provides a method, apparatus, and instructions for allowing selective just in time compiling of classes and/or methods by placing such indications within tags, which in the depicted example are HTML tags used in HTML web pages. In this manner, the mechanism of the present invention allows a web page to be modified to indicate which classes or methods should or should not be just in time compiled through the use of an applets or object tag. In this manner, applets and other applications may have classes or methods that are selectively just in time compiled. In this manner, the distributor of software may choose which Java classes should be just in time compiled and which ones should not be just in time compiled through the use of applet/object tags. This mechanism includes adding an additional optional parameter to the applet/object tag used in HTML pages that display Java applets. These options are identified by the browser and passed to the JVM for use during initialization of the applet. The JVM uses the data from the tag to identify which clauses and/or methods should or should not be just in time compiled.

With reference now to FIG. 4, a diagram of components used to selectively process methods are depicted in accordance with a preferred embodiment of the present invention. In this example, browser 400 receives an HTML format web page 402. In the depicted example, browser 400 is a web browser, such as Netscape Communicator available from Netscape Communications Corporation. In addition, a "browser" may encompass other applications that operate in a Java based network or other distributed network. JVM 404 includes a class loader 406 and interpreter 408. Interface 410 is the component containing the mechanism and process of the represent invention. Data structure 412 is used by interface 410 to determine whether or not to just in time compile a method. Also shown in FIG. 4 is just in time (JIT) compiler 414, which includes a compiler unit 416. JVM 404 and JIT compiler 414 contain other components, which are not shown to avoid obscuring the description of the present invention.

Browser 400 receives web page 402 including an applet 403. Browser 400 parses web page 402 for various tags. A tag in HTML is a code that identifies an element in a document, such as a heading or paragraph, for the purposes for formatting, indexing, and linking information to the document. In HTML, a tag is generally a pair of angle brackets that contain one or more letters and numbers. Typically one pair of angle brackets is placed before an element and another pair is placed after the element to indicate when the element begins and ends. In the depicted example, these tags are used to include additional information as to whether a class or method should be just in time compiled. Upon finding a tag containing information about compiling methods or classes, browser 400 store information in data structure 412. Thereafter, browser 400 will pass the applet to JVM 400 for execution.

JVM 404 will start execution of the applet by invoking a method of a specified class. In the depicted example, this method may be for example, main. The method may be passed a single argument in the form of an array of strings.

This causes the specified class to be loaded, linked to other types that it uses, and initialized. The loading of a class involves finding the binary form of a class or interface type with a particular name. In the depicted example, the loading process is implemented by class loader 406. Class loader 406 in this example includes a ClassLoader class, which includes methods for loading new classes into the Java runtime environment. Interpreter 408 is a program that translates the bytecode to a native instruction and then executes the native instructions. The bytecode is translated into a form executable by the computer on which the JVM is located.

JIT compiler 414 includes a compiler unit 416 incorporating a compiler class, which includes methods for compiling methods to native instructions prior to execution. In this example, the compilation occurs only once per method. Some JIT compilers may compile entire classes, rather than one method at a time. A specific class or method may be compiled by passing an instance of the method or class to compiler unit 416 in JIT compiler 414.

Interface 410 receives the call or passing of method destined for JIT compiler 414. Interface 410 may receive or intercept the method being passed to JIT compiler 414 by registering itself as a JIT compiler that is to receive the method in place of JIT compiler 414. The method is received from JVM 404 by interface 410 through a compile class API invoked by interpreter 400 in JVM 404. Interface 410 takes the method information received from class loader 406 and determines whether or not to just in time compile the method. This determination may be made by comparing the method name to a list or table of methods in a data structure 412 containing information about methods that produce invalid results or errors when just in time compiled, which is also referred to as JITed. Some of these errors result from faulty logic in the just in time compiler. This data structure may contain information for a specific JIT compiler, such as JIT compiler 414. If the method is to be JITed, the method is then passed on to JIT compiler 414. Otherwise, interface 410 may place a call to have interpreter 400 interpret the method. Alternatively, processing of the method may be terminated.

With reference now to FIGS. 5A–5C, examples of tags used in HTML pages for indicating whether methods or classes should be just in time compiled. In FIG. 5A, tag 500 indicates that the class "ticker" should never be JITed. Tag 500 proceeds applet 502, which in this example contains the applet, which will use the class ticker. In FIG. 5B, tag 504 includes the optional parameter in which the method "ticker.init" is never just in time compiled. In FIG. 5C, tag 506 indicates that "ticker_JIT_list.txt" is a file that contains a list of methods/classes that should never be just in time compiled. In this case, the file containing the list of methods/classes not to be JITed is located at a web site. The browser will download the class and/or methods from the web site for use with the applet.

A determination of whether certain classes or methods should be just in time compiled may be identified through the use of presently available performance analysis tools to gather run time statistics. These run time statistic may be stored in the HTML documents or on some server. These changes to the just in time compiling of various methods and/or classes may occur on various levels. For example, the various selections of whether to just in time compile Java code may be done on a client by client basis in which the tag for the web page is modified based on a particular client. In addition, these changes may be made based on the JVM that is used. Alternatively, the indications may be made based on the operating system running on a client.

With reference now to FIG. 6, an example of a data structure containing user specified data for class/method information is depicted in accordance with a preferred embodiment of the present invention. This data structure is used to determine which methods or classes should be just in time compiled. Data structure 600 includes a number of entries 602–612 in which each entry identifies a class/method and an indication as to whether the method is to be JITed or not JITed. A "no-JIT", such as that found in entry 604 for class/method B indicates that the method should not be JITed.

Figure 7:
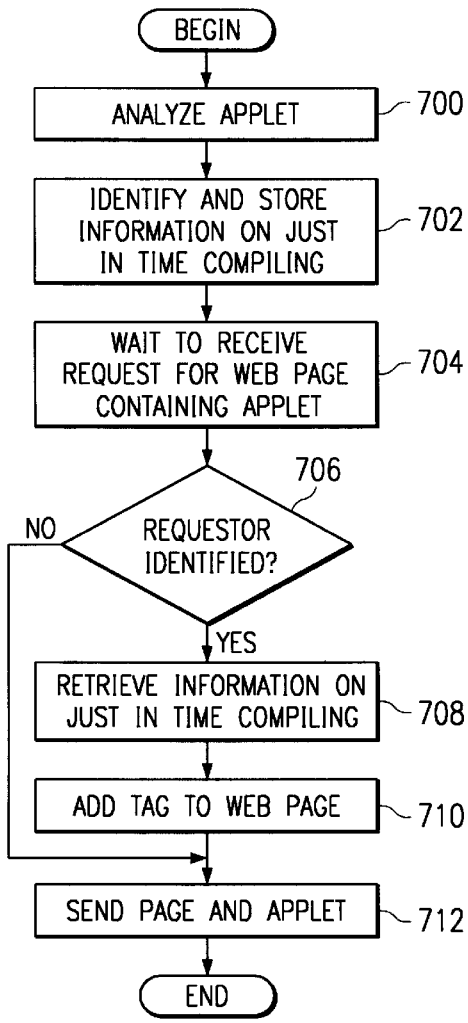
FIG. 7 is a flowchart of a process used to determine whether a program should be just in time compiled in accordance with a preferred embodiment of the present invention.

Referring now to FIG. 7, a flowchart of a process used to determine whether a program should be just in time compiled is depicted in accordance with a preferred embodiment of the present invention. The process begins by analyzing the applet (step 700). Next, information is identified and stored from the analysis of the applet regarding which methods can be just in time compiled without errors (step 702). This step may involve storing information about particular clients, JVMs, or operating systems with respect to what methods and/or classes should be just-in time compiled. The process then waits to receive the request for the web page containing the applet (step 704). In response to receiving a request for the page containing the applet, a determination is then made as to whether the requester can be identified (step 706). The identification of the requester may be as to whether the requester is a particular client stored in the database. In addition, identification of the requester may involve determining whether a JVM or operating system can be identified for the particular requester. If the requester can be identified in the database, then information is retrieved regarding just n time compiling of methods and/or classes (step 708). This information is placed into a tag that is added to the web page (step 710). In the depicted example, this tag is placed just prior to the tag identifying the applets. Then, the web page and the applet are sent to the requesters (step 712) with the process terminating thereafter. With reference again to step 706, if the requester can not be identified, the process then sends the page and applet without any modifications.

Figure 8:
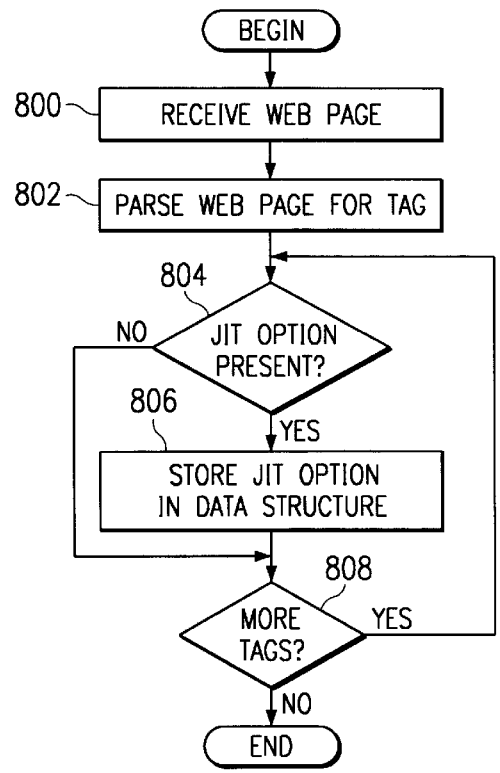
FIG. 8 is a flowchart of a process for processing a web page at a browser in accordance with a preferred embodiment of the present invention.

With reference now to FIG. 8, a flowchart of a process for processing a web page at a browser is depicted in accordance with a preferred embodiment of the present invention. This process is implemented within a browser to identify whether tags containing just in time compile options are present. The process begins by receiving a web page (step 800). Thereafter, the web page is parsed to identify tags (step 802). A determination is made as to whether a tag with a just in time compile option is present within the web page (step 804). If a tag with a just in time compile option is present, the information on the just in time compile option is stored in a data structure (step 806). In the depicted example, this data structure is a data structure such as data structure 412 in FIG. 4. This data structure is accessible by the interface of the present invention for use in determining whether a method or class should be just in time compiled. Then, a determination is made as to whether additional tags are present (step 808). If additional tags are present, the process returns to step 804. Otherwise, the process terminates. With reference again to step 804, if the tag does not include a just in time compile option, the process then proceeds to step 808 as described above.

Figure 9:
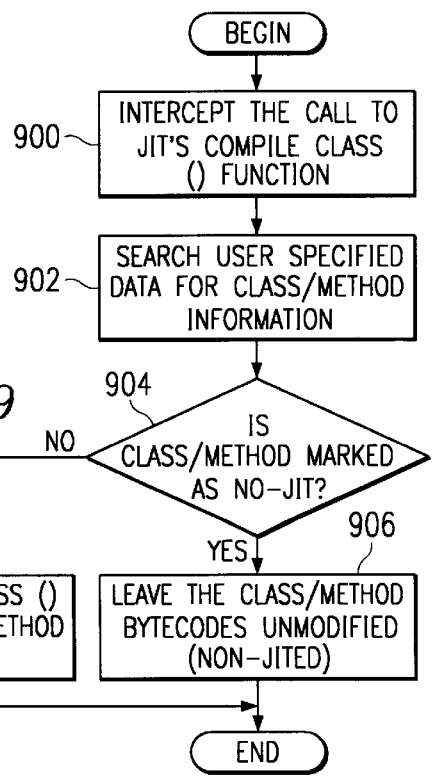
FIG. 9 is a flowchart of a process used to determine whether a method should be just in time compiled in accordance with a preferred embodiment of the present invention.

With reference now to FIG. 9, a flowchart of a process used to determine whether a method should be just in time compiled is depicted in accordance with a preferred embodiment of the present invention. The process begins by intercepting a call to the JIT compiler's compile class function (step 900). Thereafter, a search is made for user specified data for a particular class/method (step 902). This search may be made in a data structure containing information about various classes or methods. In particular, the information identifies methods that produce invalid results or errors when compiled by a JIT compiler. The information may be targeted to specific JIT compilers.

A determination is then made as to whether the class/method has been marked as no JIT (step 904). This determination is made by comparing the method to be JITed to data within a data structure, such as data structure 600 in FIG. 6. If the class/method is not to be JITed, then the class/method bytecodes are unmodified (step 906) with the process terminating thereafter. These bytecodes may then be sent to the interpreter for execution. Otherwise, the class/method to be JITed is sent to the JIT compiler by calling compile class (step 908) with the process terminating thereafter.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted embodiment is directed towards processing bytecodes in Java, the processes of the present invention may be applied to is other programming languages and environments that process instructions, which are non-specific to a computer on which the instructions are to be executed. In such a case, a virtual machine on the computer may interpret the instructions or send the instructions to a compiler to generate code suitable for execution by the computer on which the virtual machine is located.

The embodiment was chosen and described in order to best explain the principles of the invention, the practical application, and to enable others of ordinary skill in the art to understand the invention for various embodiments with various modifications as are suited to the particular use contemplated.

What is claimed is:

1. A process in a computer for selectively compiling a set of instructions for an application using a compiler, the process comprising the computer implemented steps of:
   receiving a web page;
   parsing the web page for a tag, wherein the tag includes an indication of whether the set of instructions are to be compiled; and
   responsive to a determination that the tag indicates that the set of instructions should be compiled, sending the set of instructions to the compiler, wherein the compiler generates a set of native instructions for execution by the computer.

2. The method of claim 1, wherein a virtual machine having an interpreter is located on the computer and further comprising:
   responsive to a determination that the tag indicates that the set of instructions should not be compiled, sending the set of instructions to the interpreter, wherein the interpreter alternately decodes and executes each instruction within the set of instructions.

3. The process of claim 2, wherein the set of instructions are a set of bytecodes.

4. The process of claim 1, wherein the set bytecodes form a method.

5. The process of claim 2, wherein the compiler is a just in time compiler.

6. The process of claim 2, wherein the application is a Java applet.

7. A browser program for use in a computer comprising:
   receiving means for receiving a document including program;
   parsing means for parsing the document for an indication as to how the program is to be compiled; and
   storage means, responsive to finding an indication by the parsing means, for storing the indication.

8. The browser program of claim 7 further comprising:
   sending means, responsive to a determination that the indication indicates that the program should be compiled, for sending the program to the compiler, wherein the compiler generates a set of native instructions for execution by the computer.

9. The browser program of claim 8, wherein the document is a web page.

10. The browser program of claim 9, wherein the program is an applet.

11. The browser program of claim 10, wherein the compiler is a just in time compiler.

12. A data processing system in a computer for selectively compiling a set of instructions for an application using a compiler, the data processing system comprising the computer implemented steps of:
    receiving means for receiving a web page;
    parsing means for parsing the web page for a tag, wherein the tag includes an indication of whether the set of instruction are to be compiled; and
    sending means, responsive to a determination that the tag indicates that the set of instructions should be compiled, for sending the set of instructions to the compiler, wherein the compiler generates a set of native instructions for execution by the computer.

13. The data processing system of claim 12, wherein a virtual machine having an interpreter is located on the computer and further comprising: sending means, responsive to a determination that the tag indicates that the set of instructions should not be compiled, for sending the set of instructions to the interpreter, wherein the interpreter alternately decodes and executes each instruction within the set of instructions.

14. The data processing system of claim 12, wherein the set of instructions are a set of bytecodes.

15. The data processing system of claim 13, wherein the set of bytecodes form a method.

16. The data processing system of claim 13, wherein the compiler is a just in time compiler.

17. The data processing system of claim 13, wherein the application is a Java applet.

18. A computer program product in a computer readable medium for selectively compiling a set of instructions for an application using a compiler, the computer program product comprising:
    first instructions for receiving a web page;

second instructions for parsing the web page for a tag, wherein the tag includes an indication of whether the set of instruction are to be compiled; and third instructions, responsive to a determination that the tag indicates that the set of instructions should be compiled, for sending the set of instructions to the compiler, wherein the compiler generates a set of native instructions for execution by the computer.

19. A data processing system comprising:

a bus system;

a communications unit connected to the bus system;

a memory connected to the bus system, wherein the memory includes as set of instructions; and a processing unit connected to the bus system, wherein the processing unit executes the set of instructions to receive a web page; parse the web page for a tag, wherein the tag includes an indication of whether the set of instruction are to be compiled; and send the set of instructions to the compiler in response to a determination that the tag indicates that the set of instructions should be compiled, wherein the compiler generates a set of native instructions for execution by the computer.

20. A data processing system comprising:

a bus system;

a communications unit connected to the bus system;

a memory connected to the bus system, wherein the memory includes as set of instructions; and a processing unit connected to the bus system, wherein the processing unit executes the set of instructions to receive a document including program; parse the document for an indication as to how the program is to be compiled; and store the indication in response to finding an indication during parsing of the document.

* * * * *

UNITED STATES PATENT AND TRADEMARK OFFICE
CERTIFICATE OF CORRECTION

PATENT NO.    : 6,305,012 B1   Page 1 of 1
DATED         : October 16, 2001
INVENTOR(S)   : Beadle et al.

It is certified that error appears in the above-identified patent and that said Letters Patent is hereby corrected as shown below:

Column 10,
Line 41, "instruction" should be -- instructions --.

Column 11,
Line 3, "instruction" should be -- instructions --.
Line 14, "as" should be -- a --.
Line 19, "instruction" should be -- instructions --.

Column 12,
Line 11, "as" should be -- a --.

Signed and Sealed this

Twelfth Day of March, 2002

Attest:

JAMES E. ROGAN
*Attesting Officer*    *Director of the United States Patent and Trademark Office*